United States Patent
Kuhn

(10) Patent No.: US 8,744,441 B2
(45) Date of Patent: *Jun. 3, 2014

(54) WIRELESS SERVICES OVER DIFFERENT CARRIER NETWORKS

(75) Inventor: Brian Gerald Kuhn, San Carlos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 731 days.

This patent is subject to a terminal disclaimer.

(21) Appl. No.: 12/691,470

(22) Filed: Jan. 21, 2010

(65) Prior Publication Data

US 2010/0120428 A1 May 13, 2010

Related U.S. Application Data

(60) Division of application No. 11/646,177, filed on Dec. 27, 2006, which is a continuation of application No. 11/218,346, filed on Aug. 31, 2005, which is a continuation of application No. 09/732,076, filed on Dec. 7, 2000, now Pat. No. 6,961,567.

(51) Int. Cl.
*H04M 1/00* (2006.01)

(52) U.S. Cl.
USPC .......... 455/435.1; 455/550.1; 455/426.1; 709/217

(58) Field of Classification Search
CPC .................................. H04W 60/00
USPC .......... 455/426.1, 435.1, 552.1, 550.1; 370/270, 352; 709/217
See application file for complete search history.

(56) References Cited

U.S. PATENT DOCUMENTS

| | | | |
|---|---|---|---|
| 4,779,081 A | 10/1988 | Nakayama et al. |
| 4,788,675 A | 11/1988 | Jones et al. |
| 5,010,547 A | 4/1991 | Johnson et al. |
| 5,012,219 A | 4/1991 | Henry |
| 5,075,684 A | 12/1991 | DeLuca |
| 5,134,719 A | 7/1992 | Mankovitz |
| 5,303,393 A | 4/1994 | Noreen et al. |
| 5,359,317 A | 10/1994 | Gomez et al. |
| 5,394,140 A | 2/1995 | Wong et al. |
| 5,430,436 A | 7/1995 | Fennell |
| 5,485,505 A | 1/1996 | Norman et al. |
| 5,603,084 A | 2/1997 | Henry, Jr. et al. |
| 5,612,682 A | 3/1997 | DeLuca et al. |
| 5,621,784 A | 4/1997 | Tiedemann, Jr. et al. |

(Continued)

FOREIGN PATENT DOCUMENTS

| | | |
|---|---|---|
| EP | 0464988 | 1/1992 |
| EP | 0820206 | 1/1998 |

(Continued)

OTHER PUBLICATIONS

U.S. Appl. No. 09/850,940, filed May 8, 2001, Kuhn et al.

(Continued)

*Primary Examiner* — Danh Le
(74) *Attorney, Agent, or Firm* — Mahamedi Paradice Kreisman LLP

(57) ABSTRACT

A system and method for providing wireless services comprises a server configured to communicate over a plurality of different carrier networks with a plurality of mobile devices and to provide wireless services from a service provider to the plurality of mobile devices.

20 Claims, 6 Drawing Sheets

(56) References Cited

U.S. PATENT DOCUMENTS

| | | |
|---|---|---|
| 5,650,776 A | 7/1997 | Mitchell et al. |
| 5,705,995 A | 1/1998 | Laflin et al. |
| 5,742,905 A | 4/1998 | Pepe et al. |
| 5,758,069 A | 5/1998 | Olsen |
| 5,787,365 A | 7/1998 | Rivero et al. |
| 5,802,304 A | 9/1998 | Stone |
| 5,819,173 A | 10/1998 | Lawrence et al. |
| 5,839,054 A | 11/1998 | Wright et al. |
| 5,850,599 A | 12/1998 | Seiderman |
| 5,859,419 A | 1/1999 | Wynn |
| 5,892,900 A | 4/1999 | Ginter et al. |
| 5,903,852 A | 5/1999 | Schaupp, Jr. et al. |
| 5,956,636 A | 9/1999 | Lipsit |
| 5,958,006 A | 9/1999 | Eggleston et al. |
| 6,000,000 A | 12/1999 | Hawkins et al. |
| 6,009,409 A | 12/1999 | Adler et al. |
| 6,035,212 A | 3/2000 | Rostoker et al. |
| 6,044,403 A | 3/2000 | Gerszberg et al. |
| 6,047,066 A | 4/2000 | Brown et al. |
| 6,108,727 A | 8/2000 | Boals et al. |
| 6,124,799 A | 9/2000 | Parker |
| 6,141,010 A | 10/2000 | Hoyle |
| 6,157,630 A | 12/2000 | Adler et al. |
| 6,157,814 A | 12/2000 | Hymel et al. |
| 6,161,140 A | 12/2000 | Moriya |
| 6,175,860 B1 | 1/2001 | Gaucher |
| 6,208,853 B1 | 3/2001 | Lo Vasco et al. |
| 6,216,112 B1 | 4/2001 | Fuller et al. |
| 6,223,030 B1 | 4/2001 | Van den Heuvel et al. |
| 6,240,185 B1 | 5/2001 | Van Wie et al. |
| 6,253,326 B1 | 6/2001 | Lincke et al. |
| 6,259,405 B1 | 7/2001 | Stewart et al. |
| 6,282,421 B1 | 8/2001 | Chatterjee et al. |
| 6,292,833 B1 | 9/2001 | Liao et al. |
| 6,300,946 B1 | 10/2001 | Lincke et al. |
| 6,301,666 B1 | 10/2001 | Rive |
| 6,339,795 B1 | 1/2002 | Narurkar et al. |
| 6,343,318 B1 | 1/2002 | Hawkins et al. |
| 6,345,298 B1 * | 2/2002 | Moriya ......................... 709/228 |
| 6,360,272 B1 | 3/2002 | Lincke et al. |
| 6,397,246 B1 | 5/2002 | Wolfe |
| 6,397,259 B1 | 5/2002 | Lincke et al. |
| 6,425,087 B1 | 7/2002 | Osborn et al. |
| 6,430,603 B2 | 8/2002 | Hunter |
| 6,453,371 B1 | 9/2002 | Hampson et al. |
| 6,457,134 B1 | 9/2002 | Lemke et al. |
| 6,480,762 B1 | 11/2002 | Uchikubo et al. |
| 6,490,445 B1 | 12/2002 | Holmes |
| 6,493,327 B1 | 12/2002 | Fingerhut |
| 6,519,470 B1 | 2/2003 | Rydbeck |
| 6,523,124 B1 | 2/2003 | Lunsford et al. |
| 6,526,275 B1 | 2/2003 | Calvert |
| 6,539,101 B1 | 3/2003 | Black |
| 6,549,773 B1 | 4/2003 | Linden et al. |
| 6,560,640 B2 | 5/2003 | Smethers |
| 6,564,056 B1 | 5/2003 | Fitzgerald |
| 6,564,104 B2 | 5/2003 | Nelson et al. |
| 6,581,025 B2 | 6/2003 | Lehman |
| 6,587,684 B1 | 7/2003 | Hsu et al. |
| 6,590,588 B2 | 7/2003 | Lincke et al. |
| 6,591,098 B1 | 7/2003 | Shieh et al. |
| 6,591,288 B1 | 7/2003 | Edwards et al. |
| 6,594,482 B1 | 7/2003 | Findikli et al. |
| 6,594,484 B1 | 7/2003 | Hitchings, Jr. |
| 6,600,743 B1 | 7/2003 | Lee et al. |
| 6,603,969 B1 | 8/2003 | Vuoristo et al. |
| 6,622,017 B1 | 9/2003 | Hoffman |
| 6,628,928 B1 | 9/2003 | Crosby et al. |
| 6,636,489 B1 | 10/2003 | Fingerhut |
| 6,636,502 B1 * | 10/2003 | Lager et al. ................... 370/352 |
| 6,675,008 B1 | 1/2004 | Paik et al. |
| 6,675,165 B1 | 1/2004 | Rothschild |
| 6,675,202 B1 | 1/2004 | Perttunen |
| 6,675,204 B2 | 1/2004 | De Boor et al. |
| 6,681,259 B1 | 1/2004 | Lemilainen et al. |
| 6,686,838 B1 | 2/2004 | Rezvani et al. |
| 6,694,428 B2 | 2/2004 | Lemke et al. |
| 6,701,521 B1 | 3/2004 | McIlroy et al. |
| 6,704,295 B1 * | 3/2004 | Tari et al. ...................... 370/270 |
| 6,732,176 B1 | 5/2004 | Stewart et al. |
| 6,745,011 B1 | 6/2004 | Hendrickson et al. |
| 6,745,029 B2 | 6/2004 | Lahtinen et al. |
| 6,795,710 B1 | 9/2004 | Creemer |
| 6,816,725 B1 | 11/2004 | Lemke et al. |
| 6,829,560 B2 | 12/2004 | Lehman |
| 6,829,596 B1 | 12/2004 | Frazee |
| 6,829,704 B2 | 12/2004 | Zhang et al. |
| 6,874,017 B1 * | 3/2005 | Inoue et al. ................... 709/217 |
| 6,880,048 B1 | 4/2005 | Lemke |
| 6,885,877 B1 | 4/2005 | Ozaki et al. |
| 6,961,567 B1 | 11/2005 | Kuhn |
| 6,996,407 B2 | 2/2006 | Taniguchi |
| 7,010,296 B2 | 3/2006 | Sakai et al. |
| 7,010,603 B2 | 3/2006 | Martin et al. |
| 7,024,464 B1 | 4/2006 | Lusher et al. |
| 7,089,036 B2 | 8/2006 | Prise |
| 7,103,370 B1 | 9/2006 | Creemer |
| 7,130,426 B1 | 10/2006 | Cha et al. |
| 7,173,651 B1 | 2/2007 | Knowles |
| 7,266,379 B2 | 9/2007 | Blight et al. |
| 7,286,251 B2 | 10/2007 | Tomida et al. |
| 7,359,516 B1 | 4/2008 | Skinner et al. |
| 7,378,771 B2 | 5/2008 | LeBlanc et al. |
| 7,387,771 B1 | 6/2008 | Kratz |
| 7,412,223 B1 | 8/2008 | Yamamoto et al. |
| 7,536,190 B1 | 5/2009 | Creemer |
| 7,538,771 B2 | 5/2009 | Nakamura et al. |
| 7,555,571 B1 | 6/2009 | Skinner |
| 7,603,139 B1 | 10/2009 | Tom |
| 7,664,946 B2 | 2/2010 | Thomas et al. |
| 7,861,009 B2 | 12/2010 | Skinner |
| 2001/0044310 A1 | 11/2001 | Lincke |
| 2001/0047272 A1 | 11/2001 | Frietas et al. |
| 2001/0049263 A1 | 12/2001 | Zhang |
| 2002/0073046 A1 | 6/2002 | David |
| 2002/0082049 A1 | 6/2002 | Prise |
| 2002/0085577 A1 | 7/2002 | Kim |
| 2002/0152400 A1 | 10/2002 | Zhang et al. |
| 2002/0161990 A1 | 10/2002 | Zhang et al. |
| 2002/0177438 A1 | 11/2002 | Sakai et al. |
| 2003/0013434 A1 | 1/2003 | Rosenberg et al. |
| 2003/0050046 A1 | 3/2003 | Conneely et al. |
| 2003/0162533 A1 | 8/2003 | Moles et al. |
| 2004/0254827 A1 | 12/2004 | Hind et al. |
| 2005/0009514 A1 | 1/2005 | Mathews et al. |
| 2005/0021458 A1 | 1/2005 | Rowe |
| 2006/0030306 A1 | 2/2006 | Kuhn |
| 2006/0116507 A1 | 6/2006 | Oppermann et al. |
| 2007/0169084 A1 | 7/2007 | Frank et al. |
| 2007/0178899 A1 | 8/2007 | Kuhn |
| 2007/0203844 A1 | 8/2007 | Kuhn |
| 2008/0003994 A1 | 1/2008 | Skinner et al. |
| 2009/0005039 A1 | 1/2009 | Kuhn |
| 2009/0076906 A1 | 3/2009 | Kansal et al. |
| 2010/0022240 A1 | 1/2010 | Skinner |
| 2010/0120407 A1 | 5/2010 | Kuhn |
| 2010/0165938 A1 | 7/2010 | Kuhn et al. |
| 2010/0169217 A1 | 7/2010 | Kuhn et al. |
| 2011/0149861 A1 | 6/2011 | Skinner |

FOREIGN PATENT DOCUMENTS

| | | |
|---|---|---|
| EP | 0825791 | 2/1998 |
| EP | 0862104 | 9/1998 |
| EP | 0646177 B1 | 12/2003 |
| EP | 1551193 | 7/2005 |
| WO | WO-9955066 A1 | 10/1999 |
| WO | WO-0115462 A1 | 3/2001 |
| WO | WO-01/65411 A1 | 9/2001 |
| WO | WO-2005/022375 A1 | 3/2005 |
| WO | WO-2006/055716 A1 | 5/2006 |
| WO | WO-2007/070510 A2 | 6/2007 |

(56) References Cited

OTHER PUBLICATIONS

U.S. Appl. No. 60/954,022, filed Aug. 6, 2007, Swift.
"Initial *Provisioning of a Cellular Device over the Air*", IBM Technical Disclosure Bulletin, Jun. 1995, vol. 38, No. 6, Jul. 1, 1995 (pp. 201-202).
International Search Report and Written Opinion of the International Searching Authority for International Application No. PCT/US2006/047358; date mailed Oct. 1, 2007; 15 pages.
Notification of Identification of Prior Art in Late Protest Under 37 CFR 1.291(a) received regarding U.S. Appl. No. 09/794,082 (F&L Ref.: 035451-0386), date mailed Oct. 18, 2004, 1 pg.
Protest for U.S. Appl. No. 09/794,082 (F&L Ref.: 035451-0386), filed Feb. 24, 2004, 4 pages.
Office Action for U.S. Appl. No. 09/850,940 (F&L Ref.: 035451-0219), date mailed Jul. 16, 2007, 9 pages.
Office Action for U.S. Appl. No. 12/133,281 (F&L Ref.: 035451-0366), date mailed Mar. 2, 2009, 9 pages.
Office Action for U.S. Appl. No. 12/133,281 (F&L Ref.: 035451-0366), date mailed Sep. 17, 2009, 9 pages.
Office Action for U.S. Appl. No. 11/646,177 (F&L Ref.: 035451-0276), date mailed Nov. 20, 2009, 10 pages.
Office Action for U.S. Appl. No. 11/218,346 (F&L Ref.: 035451-0217), date mailed Jan. 15, 2010, 8 pages.
Office Action for U.S. Appl. No. 11/646,182 (F&L Ref.: 035451-0278), date mailed Mar. 10, 2010, 14 pages.
Office Action for U.S. Appl. No. 11/774,508 (F&L Ref.: 035451-0269), date mailed Mar. 19, 2010, 11 pages.
Office Action for U.S. Appl. No. 09/850,940 (F&L Ref.: 035451-0219), mail date Apr. 12, 2010, 17 pages.
Office Action for U.S. Appl. No. 12/473,177 (F&L Ref.: 035451-0403), mail date May 11, 2010, 7 pages.
Office Action for U.S. Appl. No. 11/646,177 (F&L Ref.: 035451-0276), mail date Jun. 22, 2010, 8 pages.
Office Action for U.S. Appl. No. 12/691,930 (F&L Ref.: 035451-0428), mail date Jun. 23, 2010, 9 pages.
Office Action for U.S. Appl. No. 11/218,346 (F&L Ref.: 035451-0217), mail date Jul. 9, 2010, 9 pages.
Office Action for U.S. Appl. No. 11/774,508 (F&L Ref.: 035451-0269), mail date Jul. 19, 2010, 10 pages.
Office Action for U.S. Appl. No. 12/133,281 (F&L Ref.: 035451-0366), mail date Aug. 12, 2010, 8 pages.
Office Action for U.S. Appl. No. 11/646,182 (F&L Ref.: 035451-0278), mail date Aug. 31, 2010, 14 pages.
Notice of Allowance for U.S. Appl. No. 11/218,346 (F&L Ref.: 035451-0217), mail date Dec. 13, 2010, 7 pages.
Office Action for U.S. Appl. No. 12/646,750 (F&L Ref.: 035451-0419), mail date Sep. 20, 2010, 12 pages.
Office Action for U.S. Appl. No. 11/774,508 (F&L Ref.: 035451-0269), mail date Sep. 27, 2010, 11 pages.
Office Action for U.S. Appl. No. 09/850,940 (F&L Ref.: 035451-0219), mail date Nov. 5, 2010, 18 pages.
Skinner, C., "Automatic Network Registration and Activation for a Wireless Communications Network Device", Co-pending U.S. Appl. No. 09/755,781, filed on Jan. 5, 2001, 37 pages.

* cited by examiner

WIRELESS SERVICES OVER DIFFERENT CARRIER NETWORKS

CROSS REFERENCE TO RELATED APPLICATION

This application is a Divisional of U.S. application Ser. No. 11/646,177 filed Dec. 27, 2006, which is a Continuation of U.S. application Ser. No. 11/218,346 filed Aug. 31, 2005, which is a Continuation of U.S. application Ser. No. 09/732,076 filed Dec. 7, 2000, now U.S. Pat. No. 6,961,567, all of which applications are incorporated by reference herein. This application is related to U.S. patent application Ser. No. 09/732,066, filed Dec. 7, 2000 and titled "USER INTERFACE TECHNIQUE FOR SELECTION AND ACTIVATION OF WIRELESS SERVICES FROM AMONG MULTIPLE TRANSPORT CARRIERS", which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to wireless networks and, more particularly, to wireless network activation with carriers and registration with service providers.

2. Discussion of Background

The wireless communication revolution is bringing fundamental changes to data networking and telecommunication, and is making integrated networks a reality. By freeing the user from the cord, personal communications networks, wireless local area networks (LAN's), and mobile radio networks and cellular systems harbor the promise of fully distributed mobile computing and communications, any time, anywhere. Numerous wireless services are also maturing and are poised to change the way and scope of communication.

Many manufacturers have begun to incorporate wireless technologies into a new kind of computer—the personal digital assistant (PDA). A PDA is a computer that is small enough to be held in the hand of a user. A PDA runs personal information management applications such as an address book, a daily organizer, and electronic notepads. These applications make people's lives easier.

FIG. 1 shows a basic configuration of a popular PDA brand, the Palm™ 10. However, the Palm™ 10 is much more than a simple PDA. This small, slim, device, about the size of your wallet, can hold 6000 addresses, 5 years of appointments, 1500 to-do items, 1500 memos, 200 e-mail messages, and can run many different software applications.

The front panel of the Palms™ 10 is a large liquid crystal display ("LCD") 11, which is touch-sensitive and allows a user to enter and manipulate data. By using a stylus (not shown) to interact with the touch-sensitive screen, a user may easily navigate through a host of various software applications. A stylus is used to interact with information on a screen in much the same way a mouse is used with a desktop personal computer. The display device also includes a Graffiti™ writing section 12 for tracing alphanumeric characters as input.

Regarding wireless connectivity, a given wireless network typically has many different carriers for the same network type. For example, Bell South™ and Rogers AT&T™ are wireless carriers that both run Mobitex™ networks. Further, many wireless computers are manufactured to be compatible with a particular network type, carrier, and/or service provider.

Unfortunately, problems arise when a consumer, manufacturer, or provider later desires the computer to be compatible with another network or another carrier. Integrated within the computer's architecture, may be an operating system that allows a user to connect with a specific carrier and/or service provider. For example, applications that allow connectivity with a specific carrier, such as BellSouth™, may be written to a read-only memory (ROM) of the PDA. Such a framework makes it difficult to later make the PDA compatible with another carrier or with another type of network.

The PDA that is compatible with only BellSouth™ can not be taken to Europe to be compatible with a French carrier, much less a wireless network in France. Thus, the manufacturer that builds the PDA that is compatible with BellSouth™ will have to build a different PDA to be compatible with a French carrier, and another device for Australia, and another for Japan, etc.

While a PDA may be manufactured for a regional carrier and/or service provider, wireless networks naturally provide users with extended computing capabilities and mobility. Users are able to move about, carrying their computers with them and maintaining uninterrupted communication with their servers. Wireless networks should be able to allow users to turn on their computers almost anywhere in the world, to establish access to their home servers, and to retrieve their files and email. Such mobility, however, is difficult with commonly available wireless technology.

Consequently, the implementation of wireless networks presents new problems. Unfortunately, classical communication theory and wired network models does not efficiently solve these new problems.

SUMMARY OF TEE INVENTION

It has been recognized that what is needed is a framework for providing broader compatibility with wireless networks. Broadly speaking, the present invention fills these needs by providing a system and method for managing wireless network activation with a carrier and for handling registration with a service provider. It should be appreciated that the present invention can be implemented in numerous ways, including as a process, an apparatus, a system, a device or a method. Several inventive embodiments of the present invention are described below.

In one embodiment, a method is provided for managing network activation with a carrier and registration with a service provider. The method comprises: determining a network activation status with a carrier; if not activated, performing network activation procedures; determining a registration status with a service provider; if not registered, sending a request to a server of the service provider for a registration file configured to gather user registration information; receiving the registration file from the server; and executing the registration file.

In another embodiment, a generic framework is provided for network activation and registration. The framework comprises: a generic driver device configured to manage network activation procedures and registration procedures; and a plug-in device configured to initiate registration procedures based on commands received from the driver, wherein the plug-in device is tailored to a particular service provider.

In still another embodiment, the framework is provided wherein the plug-in device includes an address to a registration file configured to gather user registration information for the particular service provider.

Advantageously, the present invention provides a generic framework for activation and registration. The generic framework can be configured to be compatible with multiple carriers and/or service providers for any language. The generic framework can also be used for multiple wireless network types. No longer does a personal computer have to be manufactured to be compatible with individual carriers, particular service providers, or specific networks. Easily installable plug-in devices can be tailored to each carrier, service provider, or network type. Accordingly, carriers can readily make themselves compatible with a given personal computer without having to change the personal computer's ROM to fit the particular carrier, service provider, or network type. Thus, a generalized infrastructure is put in place to bring new carriers and personal computers online substantially quicker.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention is disclosed for a system and method for managing network activation with a carrier and registration with a service provider. Numerous specific details are set forth in order to provide a thorough understanding of the present invention. It will be understood, however, to one skilled in the art, that the present invention may be practiced without some or all of these specific details.

General Overview

Figure 1:
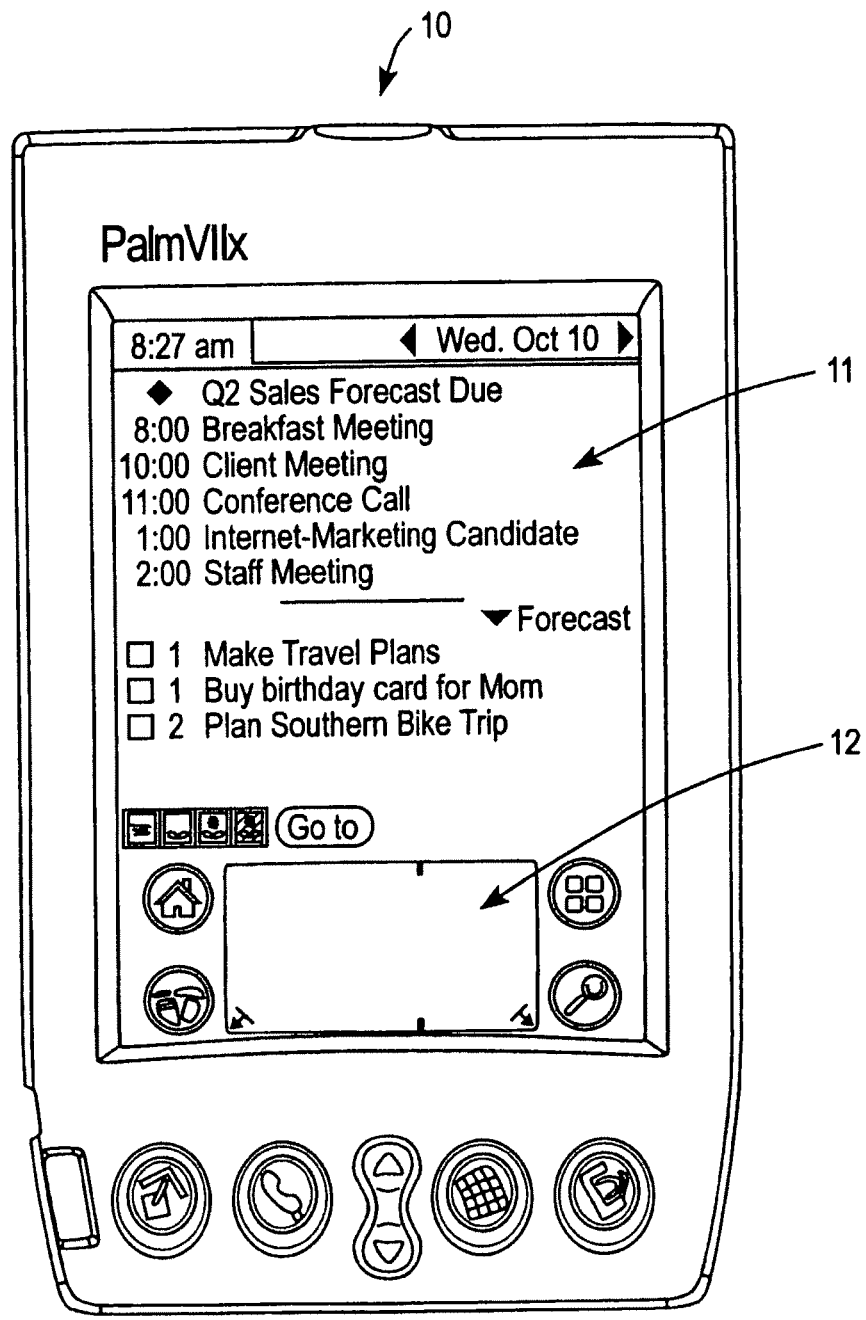
FIG. 1 shows a basic configuration of a popular PDA brand, the Palm™.
Figure 2:
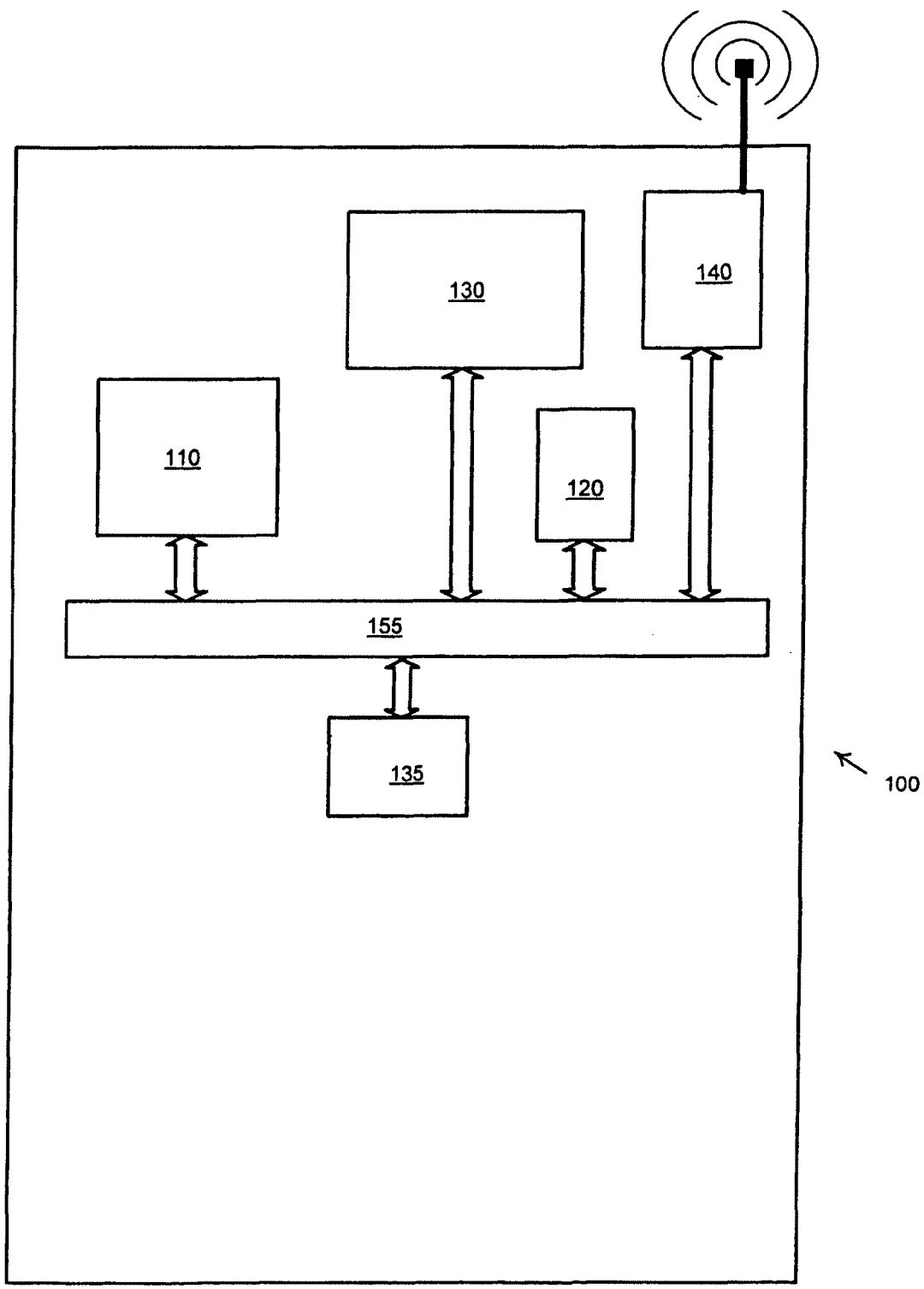
FIG. 2 is a block diagram of selected components of a computer that includes wireless network technology, in accordance with one embodiment of the present invention.

FIG. 2 is a block diagram of selected components of a computer 100 that includes wireless network technology, in accordance with one embodiment of the present invention.

The computer 100 includes a processing device 110, for executing applications and an operating system of the computer 100, a memory device 120 for storing the operating system, data, and applications (including plug-in executable files).

A display screen 130 is provided (preferably a touch sensitive screen) for display of operating system prompts, buttons, icons, application screens, and other data, and for providing user inputs via tapping or touching (or drawing in the Gaffiti™ area) via a stylus or other touch mechanism. Hardware interface 135 connects to physical hard buttons and switches located on a body of the computer 100 and provides signals to applications running on the processing unit 110.

A bus 155 carries data and commands to/from the processing unit 110 from/to other devices within the computer 100. For example, user applications running on the computer 100 may be stored in the memory device 120. The user applications send application screens and other data outputs to display screen 130 for display via the bus 155. User inputs (Graffiti™ area drawing, or tap selection, for example) are detected by the screen 130 and sent to the processing unit 110 via the bus 155.

A mobile radio device 140 (part of the wireless technology in the computer 100) provides connectivity to a wireless network (not shown). The mobile radio device 140 is configured to detect inbound network transactions from the network directed toward the mobile radio device 140. For example, the inbound network transaction may be a page notification that is sent to a pager device executing on the processing unit 110.

In the embodiment of FIG. 2, the computer 100 is illustrated as a personal digital assistant (PDA). A PDA is a handheld computer such as a Palm™, Palm III™, or Palm V™, or Palm VII™ organizers, manufactured by Palm, Inc. Other embodiments of the invention can include Windows CE™ and Visor™ handheld computers, other handheld computers, other personal digital assistants (PDAs), desktop computers, laptop computers, workstations, or mainframes.

The Palm™ and its operating environment are used herein to illustrate various aspects of the present invention. However, it should be understood that the present invention may be practiced on other devices, including other Palm™ models, PDA's, computer devices, personal computers, notebooks, etc.

General Overview of Generic Activation Framework

Figure 3:
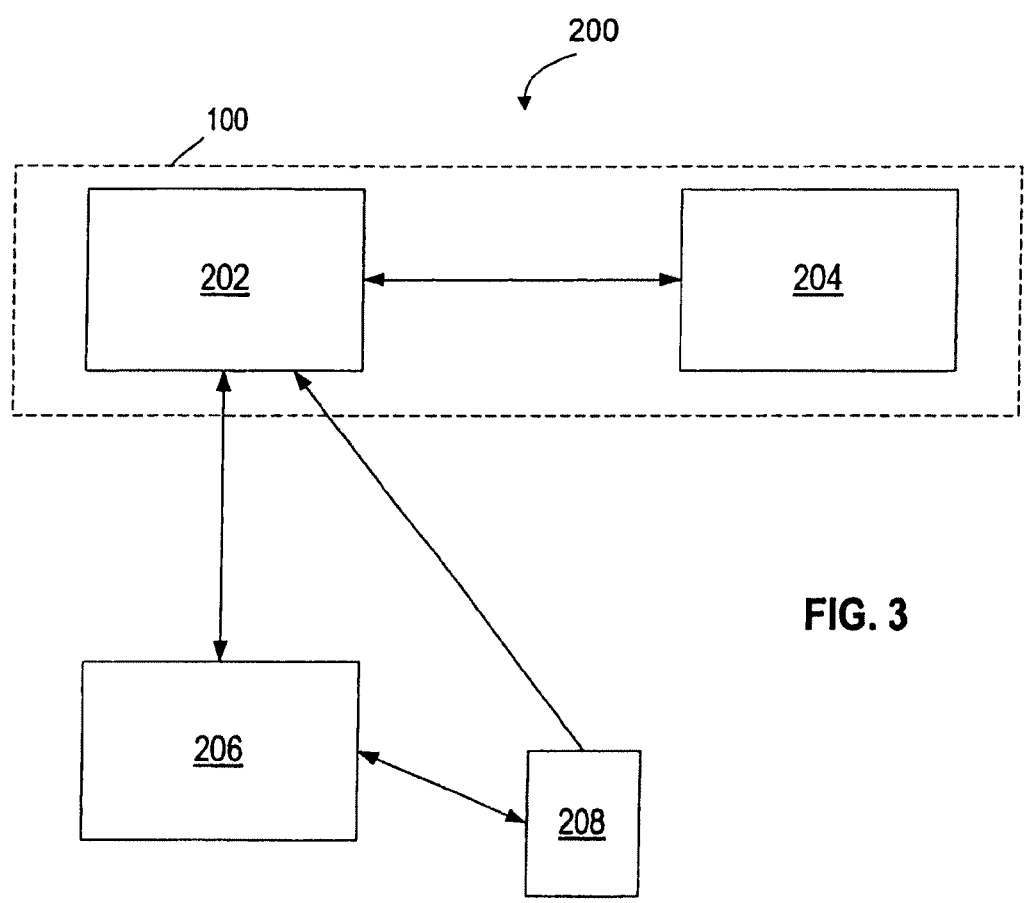
FIG. 3 is a block diagram of the architecture for the generic activation and registration framework (GARF), in accordance with one embodiment of the present invention.

FIG. 3 is a block diagram of the architecture for the generic activation and registration framework (the "GARF") 200, in accordance with one embodiment of the present invention. The GARF is a system for providing network activation and registration in a network that may have multiple carriers and/or service providers.

The GARF 200 provides a driver device 202 that generally controls network activation and registration procedures for the computer 100. Networking applications that may be tailored for a specific carrier or service provider are not included in the driver device. Rather, a plug-in device 204 (or multiple plug-in devices) may be installed in the computer 100. A plug-in device 204 includes hardware and/or software specifically tailored for a particular carrier and service provider. Through a given plug-in device 204, the computer 100 can communicate with a carrier and service provider that is intended for that plug-in device 204. For example, a driver device 202 may communicate with a provider's web server 206 with assistance from the plug-in device 204. Additionally, the provider's web server 206 can send a registration file 208 to the driver device 202, which can then launch the registration file 208 in the computer 100. The registration file 208 is an executable file configured to allow the computer 100 to be compatible with a particular carrier and/or service provider.

The GARF 200 allows manufacturers to build a computer 100 for operation in wireless networks of any verbal language. For example, a generic driver device 202 may be built that is nonspecific to any particular verbal language. The plug-in device 204, on the other hand, may be then be configured to be language specific. If France, for instance, has three different service providers that operate the same way in the French language, the GARF 200 allows one computer 100 to communicate with all three service providers. In another embodiment, the plug-in device 204 is generically built such that the computer 100 is generically operable in any wireless network of any verbal language.

Overview of Driver Device

The driver device 202 is hardware, software, or combination thereof, that is configured to manage procedures of the GARF 200. In one embodiment, the driver device 202 includes an icon on the display screen 130 for a user to select. Selection of the icon launches GARF 200 procedures, including activating a wireless network with a carrier and handling user registration with a service provider. BellSouth™, used with Palm VIII™, is an example of a carrier. Palm.Net™, used with Palm VII™, is an example of a service provider. Palm.Net™ currently resells BellSouth™ services for use with Palm VII™.

In one embodiment, the driver device 202 is an executable application that a user will launch upon their first interaction with a wireless capable computer 100. The driver device 202 will drive the configuration of the computer 100 to obtain wireless connectivity, as well as perform the tasks required to obtain an account and/or identity with a particular carrier and/or service provider. In one example, the driver device 202 may be launched by applications such as Clipper™ (used in the Palm™ operating system) when wireless connectivity has not yet been established for the computer 100.

A feature of the GARF 200 is the ability for a user to step through a number of screens in order to provide personal data to a wireless service provider, such as Palm.Net™. This setup process involves a number of steps, including retrieving the appropriate screen(s), entering user information, submitting the information to the driver device, writing the personal data in memory, and submitting the data to the service provider.

The driver device 202 is responsible for maintaining the system features (via the plug-in device 204). As an example, the Palm™ operating system requires certain system maintenance to ensure successful network transactions with the carrier and service provider. The driver device 202 accomplishes its tasks by launching a plug-in device 204 to activate the network on the device (and to display location/carrier-specific user interfaces and error messages). The driver device 202 can also call upon a registration file 208, which in turn may be configured to execute registration procedures on the computer 100. The driver device 202 exposes and calls upon application program interfaces (API's) in both the plug-in device and the registration file 208.

The driver device 202 is not tailored to a specific carrier and/or service provider. Rather, the driver device 202 is generic to various carriers and/or service providers in a given wireless network. For example, the driver device 202 may be generally operable in all networks in France, but the internal components are not programmed to handle communications with one specific carrier and/or service provider. In one embodiment, the driver device 202 is built into the memory device 120 or, more specifically, into a read-only memory (ROM) portion of the memory device 120.

In one embodiment, communications from the provider's web server 206 to the driver device 202 are handled in a protocol that includes Hypertext Transfer Protocol (HTTP) over Transmission Control Protocol/Internet Protocol (TCP/IP). Communications from the driver device 202 to the carrier are handled in a protocol that includes Hypertext Transfer Protocol (HTTP) over Compressed Transfer Protocol (CTP), or the carrier's own network protocol is used. Another embodiment handles communications with File Transfer Protocol (FTP) over TCP/IP. Other types of TCP/IP-based protocols may alternatively be used to communicate. The present invention is not limited to the specific protocols disclosed herein.

In an alternative embodiment, deactivation of the carrier and de-registration of the service provider can occur. A computer 100 is deactivated when the computer 100 is no longer enabled to communicate in the wireless network. A computer 100 is de-registered when the computer 100 no longer has an account with a service provider. Deactivation or de-registration can occur in at least the following two ways: some external process (outside of the computer 100) can be invoked to execute deactivation or de-registration; or the plug-in device 204 can be explicitly prompted to execute deactivation or de-registration.

To deactivate/de-register a computer 100, the driver device 202 searches through all plug-in devices 204 in the computer 100. If no plug-in devices 204 are found, deactivation is complete because without a plug-in device, a computer 100 is not network activated. In searching for plug-in devices 204, the computer 100 determines which network plug-in device is responsible for deactivation. The driver device 202 launches the found plug-in with a deactivation code. Note that the deactivation code must be accompanied by appropriate parameters to denote the desired plug-in device for deactivation. If the plug-in device also contains the service provider's registration (or de-registration) set of codes, the driver device 202 must determine whether to launch the plug-in device 204 with a "de-register" code first. In one embodiment, the deactivation code is called by a registration file 208 that is in the process of deactivating a component of service.

Overview of Plug-in Device

The plug-in device 204 is hardware, software, or combination thereof, that allows the computer 100 to be compatible with a particular carrier and particular service provider. In a preferred embodiment, the plug-in device 204 is an interface between software (e.g., wireless browser application) and hardware (e.g., mobile radio device 140) in the computer 100.

The plug-in device 204 may be configured to assist in establishing activation and registration, by executing functions such as the following: setting system features for the network activation upon resetting of the GARF 200; network activation/deactivation with a particular carrier and registration/de-registration with a particular service provider; maintenance of account identification for a particular carrier and a particular service provider; and initiating appropriate user interfaces during error conditions.

In a preferred embodiment, the plug-in device has the following two primary purposes upon launch by the driver device 202: (1) activate the computer 100 on a wireless network; and (2) register the computer 100 with a service provider such as Palm.Net™, thereby allowing the computer 100 to utilize the service provider's wireless services. The purpose of the GARF 200 is to perform common procedures in the wireless network. The plug-in device 204 is the component of the GARF 200 that contains differences for a particular mobile radio device 140, a particular carrier, and a particular service provider, among other things. In one embodiment, the plug-in device 204 is an executable file that is easily installable into memory of the computer 100.

A plug-in device 204 is responsible for network activation and registration, setting system features, and updating the memory state of the computer 100 according to the network being activate. In one embodiment, the plug-in device 204 is tailored for a particular carrier and particular service provider. BellSouth™ is an example of a carrier. Palm.net™ is an example of a service provider. The carrier and service provider, in turn, operate in a particular type of network. Mobitex™ is an example of a wireless packet data network. Other examples of a network include a cell phone network, a digital personal communications service (PCS) network, and a global system for mobile communications (GSM) network. Thus, the plug-in is further configured to be compatible with the network in which the particular carrier operates.

As a secondary function, the plug-in device 204 provides error and warning code user interfaces, which are tailored to a particular verbal language (e.g., French, English, German, Spanish).

In another embodiment, the plug-in device 204 is designed to be compatible with multiple carriers and service providers in a given network. For example, the plug-in device 204 may be multiplexed to receive a call from the driver device 202, and the plug-in device 204 may then switch between different carriers, depending on the call. In still another embodiment, multiple, different plug-in devices 204 may be installed in the computer 100, for example, to allow the user to have a choice of various carriers and/or service providers. In yet another embodiment, a general plug-in device 204 is provided, for example, a plug-in device compatible with an English language wireless network covering all of North America. Alternatively, a more specific plug-in device 204 may be installed to handle carriers and service providers, for example, in just the western United States.

Further, the different plug-in devices 204 may be configured to be compatible with each other. Regardless of the particular configuration of the plug-in devices 204, however, a plug-in device 204 is a component that can be readily redesigned after a computer 100 has been manufactured. Such flexibility of a plug-in device 204 is useful because hardware and software components in a computer 100 may be entrenched within the computer's operating system (e.g., the ROM). Thus, the plug-in device 204 provides a component for the computer 100 that facilitates changing the computer's compatibility for different carriers and/or service providers.

Regarding commands that the driver device 202 sends to the plug-in device 204, a plug-in device 204 is preferably designed to handle certain predefined launch codes from the driver device 202. Table 1 below contains examples of launch codes that may be used in the Palm™ operating system.

TABLE 1

Examples Of Launch Codes That Driver Device 202 May Include In A Command Sent To Plug-In Device 204

| | |
|---|---|
| PLUGIN_TYPE | Return a wireless network or service provider, or both to the caller-noting the type of plug-in |
| WN_RESET | Set any system features needed for network stack of device release |
| SP_RESET | Set any system features needed for service provider |
| CK_WN_ACTIVATE | Check system features and memory values (when system features may not be correct) to determine (true or false) if the wireless network is active |

TABLE 1-continued

Examples Of Launch Codes That Driver Device 202 May Include In A Command Sent To Plug-In Device 204

| | |
|---|---|
| WN_ACTIVATE | Configure a device so that it is able to effectively communicate on the network |
| WN_DEACTIVATE | Perform a wireless network deactivation |
| CK_SP_REGISTER | Check system features and database entries (when system features may not be correct) to determine (true or false) if the service provider has been registered with. If the service provider has not been successfully registered with, this call will return false, with an optional parameter of a URL. The URL can then be used by the driver to retrieve a registration file 208. |
| SP_DEACTIVATE | Remove any system features, database entries, or flash values utilized by the service provider to denote successful registration. |
| SP_COMPLETE | Perform any service-provider-centric flash/system feature/database entry activity that denotes the FINAL step of activation and registration |
| SP_FAIL | Perform any service-provider-specific cleanup activity that must be performed to return the state of the device to normal |

Overview of Auxiliary Screen Flow

In order to create and provision accounts with a given service provider, the service provider most-likely wants to collect data about the user. Such data may include name, address, account identifier, password, etc.

The auxiliary screen flow of the GARF 200 involves downloading and executing a registration file 208 from the provider's web server 206. A registration file 208 is preferably an executable file configured to be executed as-is on the computer 100. (In the Palm™ operating system, an executable file is commonly referred to as a "PRC".) The registration file 208 renders a set of dialogs (or "screens") to collect user registration data. The registration file has a calling convention and an expected set of results. The driver device 202 can then control procedures to set up the account for the user.

In other words, in order to collect user information for service provider registration, the driver device 202 has the ability to dynamically query (i.e., download) a server of the provider for the registration file 208. The registration file 208 is preferably kept as minimal in size as possible so as not to unduly delay the user's experience. As an example, the plug-in device sends a uniform resource locator (URL), or address, to the driver device 202. The driver device 202 in turn sends a request to the provider's web server 206 to retrieve the registration file 208 located at the URL. Once retrieved, the registration file 208 may be executed on the computer 100 to collect user registration data. In one embodiment, execution of the registration file 208 involves communicating directly with the web, without first going through the driver device 202.

The registration file 208 should be a temporary executable file configured to delete itself after its operations have been performed (i.e., after registration is complete). The registration file 208 should exit execution successfully (or with a failure error) directly to the driver device 202, so that any cleaning-up or processing by the computer 100 may resume. In other words, the registration file 208 should not leave the computer 100 in an unstable state. In one embodiment, the registration file 208 uses Compressed Transfer Protocol (CTP) calls. The registration file 208 may be configured to utilize error and warning user interfaces contained within the plug-in device 204. In a preferred embodiment, the registration file 208 is configured to utilize error and warning user interfaces contained within the registration file 208 itself.

The registration file 208 can be configured dynamically by the service provider. For example, if the service provider changes its rate plan, the registration file 208 can readily be changed to accommodate the new rate plan. The new rate plan can then be displayed to the user when the registration file 208 is downloaded and executed on the computer 100. Note that the registration file 208 resides outside of computer 100 (at provider's web server 206, for example) before the registration file 208 is downloaded and executed by the driver device 202.

Overview of Provider's Web Server

In a preferred embodiment, the provider's web server 206 is accessible via a communication network. Examples of a communication network include a local area network (LAN), a wide area network (WAN), the global packet-switched network known as the "Internet" or the "World Wide Web" (web). The web server 206 provides the registration files 208 of the auxiliary screen flow, as well as any other logic to be used from within the executable file. In one example, the provider's web server 206 is accessible via the Internet through Palm™ Web Clipping Proxy Servers. HTTP is the proxiable protocol handled by Web Clipping Proxy Servers.

As discussed above with reference to the auxiliary screen flow, the plug-in device 204 may return a URL to the driver device 202. The URL is then sent as a request to the provider's web server 206. That URL returns one static registration file 208 for the auxiliary screen flow. Accordingly, the service provider preferably carves some space from its file system directory to store the screens for the execution of the registration file 208.

Process Overview

Figure 4:
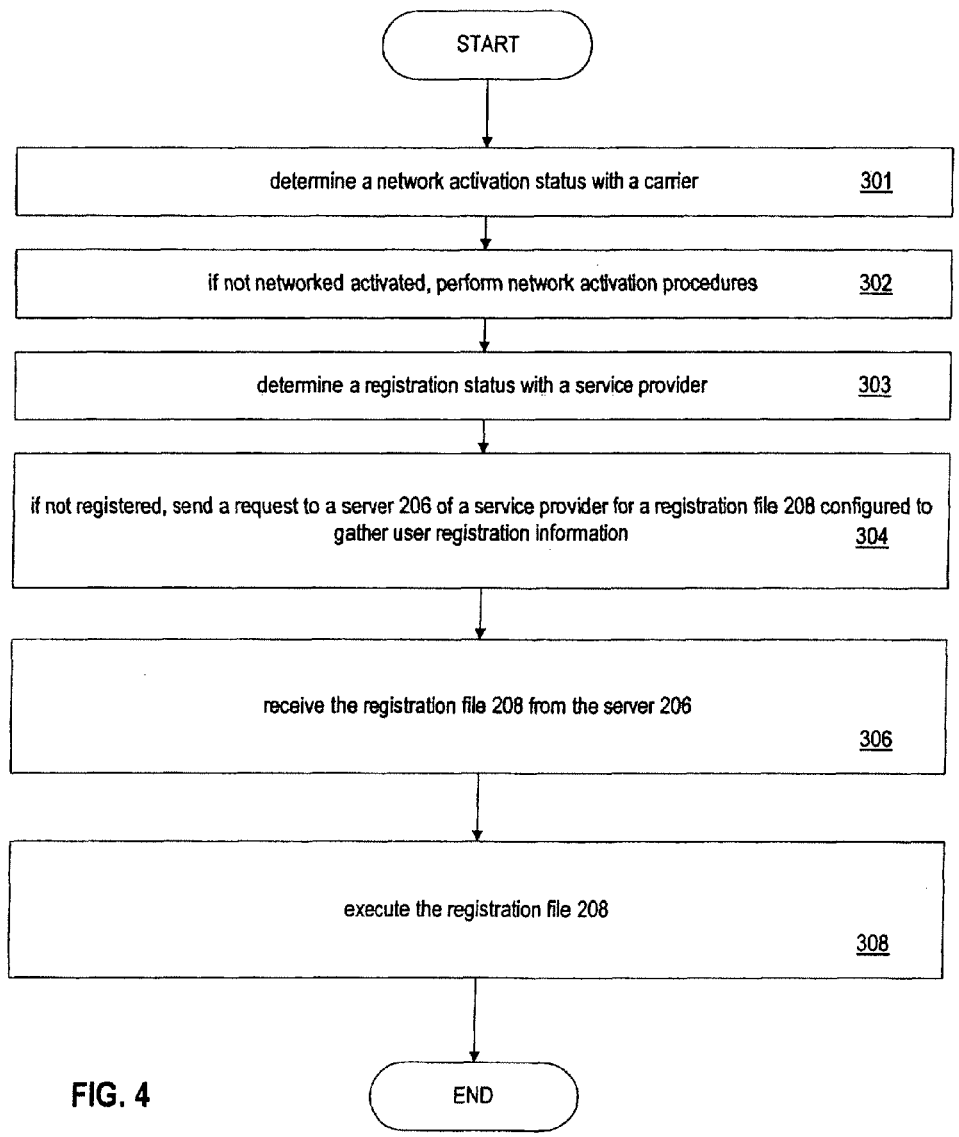
FIG. 4 shows a high-level flowchart for a method of managing network activation with a carrier and registration with a service provider, in accordance with one embodiment of the present invention.

FIG. 4 shows a high-level flowchart for a method of managing network activation with a carrier and registration with a service provider, in accordance with one embodiment of the present invention. The method starts in step 301 where a network activation status is determined. It may be determined, for example, that a wireless network for the mobile radio device 140 is enabled, but the computer 100 is not activated with a carrier. In such a case, the computer 100 will perform network activation procedures in step 302.

In step 303, registration status with a service provider is determined. If the computer 100 is not registered, a request will be sent to a server of a service provider in step 304. This request preferably contains an address to a registration file 208 configured to gather user registration information. The registration file is received from the server in step 306. In step 308, the registration file 208 is executed on the computer 100. Execution of the registration file 208 involves gathering registration information from the user. In an another embodiment, the method further includes returning the gathered data to the server to complete network activation.

In one embodiment, the method steps of FIG. 4 are managed by the driver device 202. As discussed above with reference to FIG. 3, the driver device will drive the configuration process to obtain wireless network activation, as well as perform the tasks required to obtain an account and/or identity with a particular service provider.

Figure 5A:
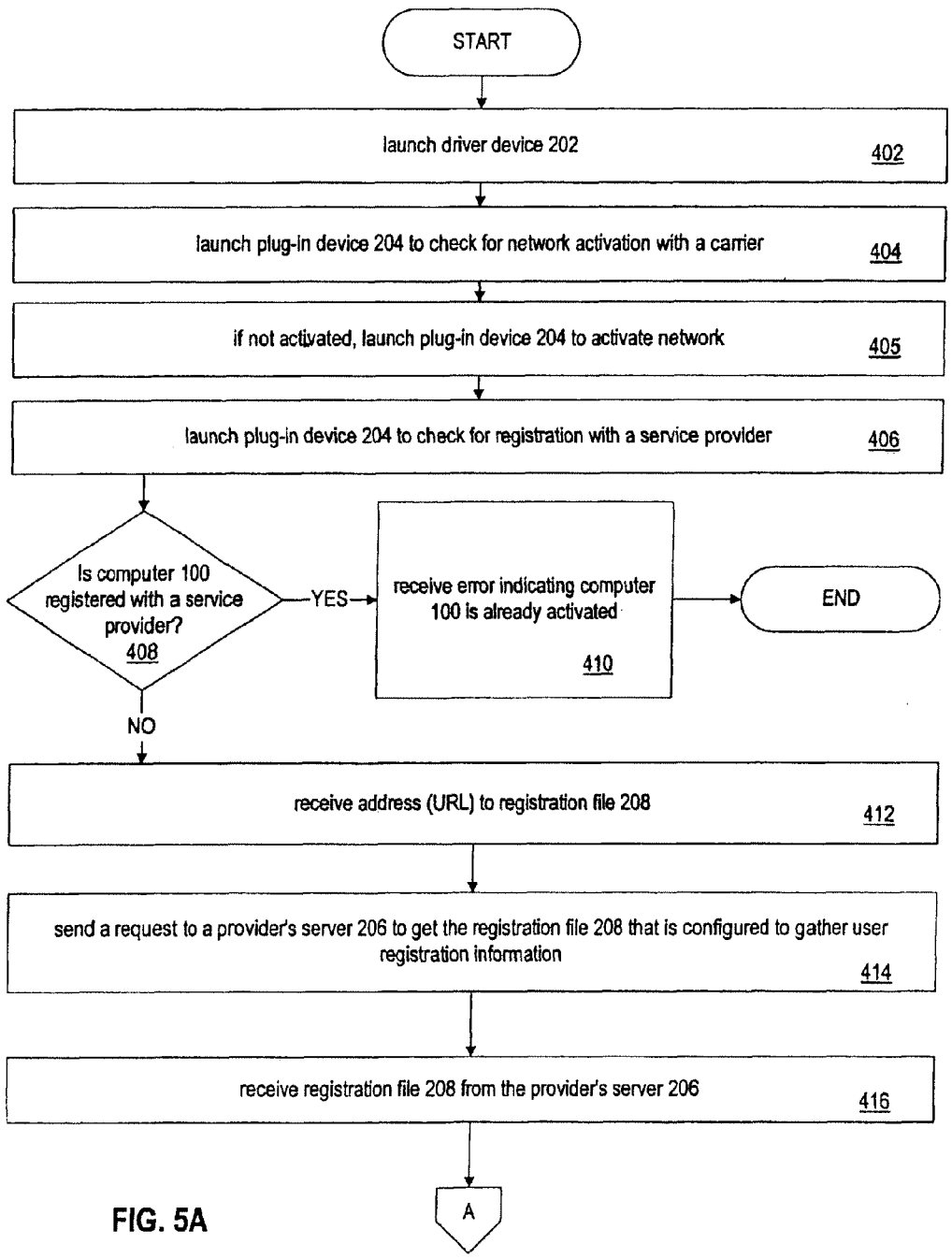
FIG. 5A shows a more detailed flowchart for a method of managing network activation with a carrier and registration with a service provider, in accordance with one embodiment of the present invention.
Figure 5B:
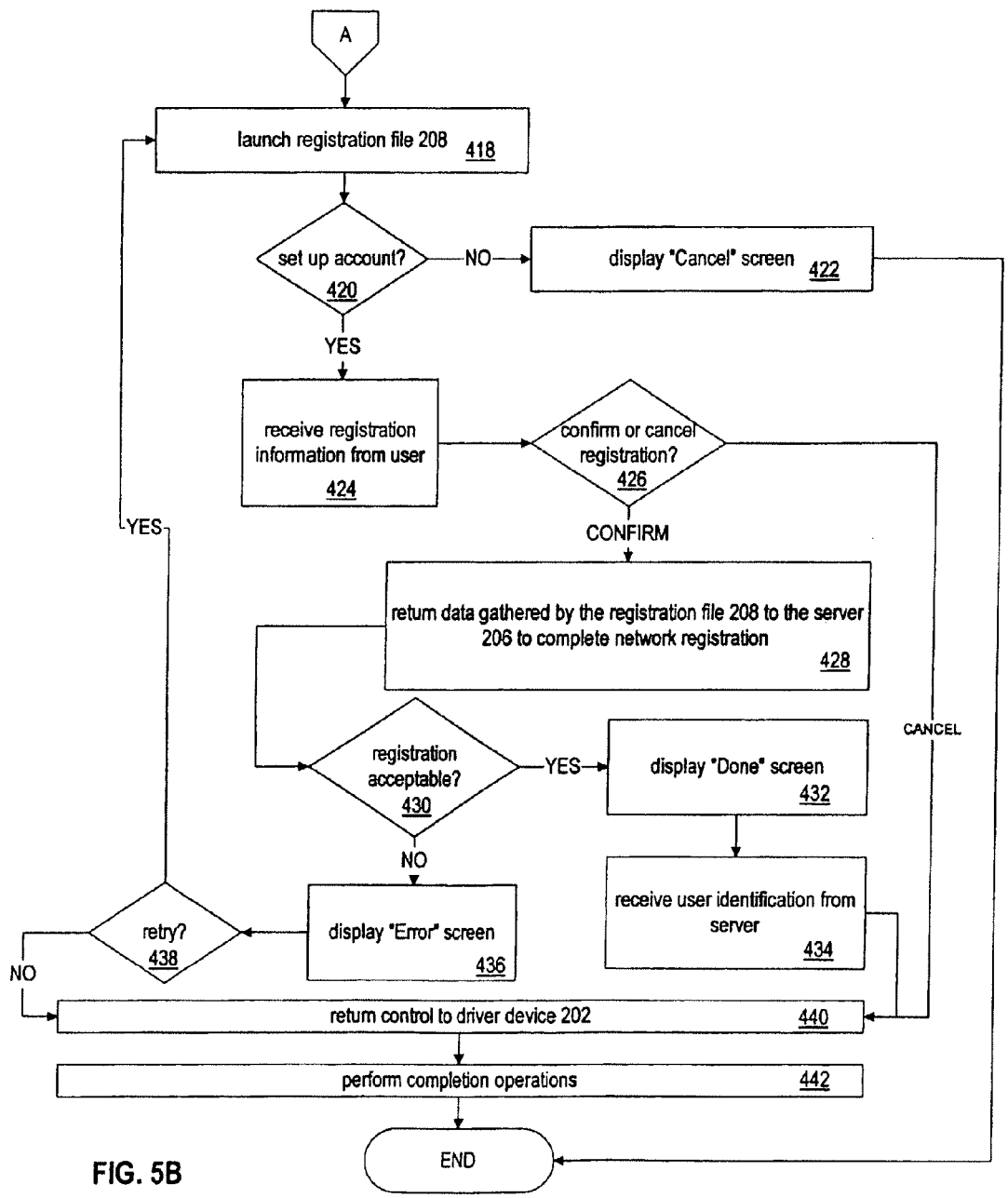
FIG. 5B is a continuation of the flowchart of FIG. 5A, in accordance with one embodiment of the present invention.

FIG. 5A and FIG. 5B, collectively, show a more detailed flowchart for a method of managing network activation with a carrier and registration with a service provider, in accordance with one embodiment of the present invention. The method starts in step 402 where a driver device 202 in the computer 100 is launched. For example, the driver device 202 may include a user-selectable icon on the display screen 130 of the computer 100, as discussed above with reference to FIG. 3. Upon selection of the icon, the driver device 202 is launched, thereby starting procedures of the GARF 200.

In step 404, the plug-in device 204 is launched to check for network activation with a carrier. As discussed above with reference to FIG. 3, the computer 100 may contain multiple, different plug-in devices 204. In a preferred embodiment, the driver device 202 scans for all of the plug-in devices 204 by searching the computer 100 for devices that match a particular file type. Accordingly, when a plug-in device 204 is designed, the plug-in device 204 should be designed to match a predetermined type that is searchable by the driver device 202. In one embodiment, the driver device 202 makes a call to each and every plug-in device 204 and checks for network activation in each.

As an example of step 404, the driver device 202 sends a "check wireless network activation" command (e.g., CK_WN_ACTIVATE) to a plug-in device 204 that has information on whether the computer 100 is network activated. "Network activated" means that the computer is capable of communicating in the network (e.g., Mobitex™) provided by the carrier (e.g., BellSouth™). Accordingly, a given wireless network can have multiple, different carriers operating in the given wireless network type. In a preferred embodiment, the computer 100 is manufactured to be network activated by having the mobile radio device 140 and appropriate network components built into the operating system of the computer 100. If the computer 100 is not network activated, a plug-in device 204 is launched in step 405 to activate the network with the computer 100. The launched plug-in device handles the activation process. If network activation fails, an error is returned to the driver device 202, an appropriate error message is displayed, and the method is done.

Assuming the computer 100 is appropriately network activated; a plug-in device 204 is launched to check for registration with a service provider in step 406. "Device" registration means that the computer 100 has an account with a service provider in the wireless network. In an alternative embodiment, "user" registration means that the user of the computer 100 has an account with the service provider. In another embodiment, both the device and the user may be registered with the service provider, and the account with the service provider contains information specific to both the user and the particular device (i.e., computer 100). In this description, "device" registration and "user" registration may be used interchangeably to refer generally to account registration with a service provider.

In decision operation 408, it is determined if the device is registered with a service provider. In other words, it is determined if an account exists with a service provider in the given wireless network. If the device is registered, a plug-in device is launched in step 410 with an error to indicate the device is already registered. For example, a dialog screen (e.g., "Already Activated") is displayed to indicate to the user that the computer 100 has previously been registered with Palm.Net™.

However, if the device is not registered, an address to a registration file 208 is received from the plug-in device 204 in step 412. For example, the plug-in device 204 may have a URL for a registration file 208, as discussed above with reference to FIG. 3. In one embodiment, this registration file 208 is located on a provider's web server 206. The registration file 208 is an executable file configured to gather registration information from the user. The plug-in device 204 sends the registration file's URL to the driver device 202 upon determining that the computer 100 is not registered with the particular service provider.

In step 414, a request is sent to a server of the service provider for the registration file 208. For example, as discussed above with reference to FIG. 3, the driver device 202 sends an HTTP request to a web server of the service provider. The HTTP request includes the registration file's URL. Communications with the provider's web server 206 may include procedures for encrypting data, connecting with the web server, and sending the URL to the web server. Information that may be imbedded in the URL includes the following: carrier identification, the type of verbal language (e.g., English or French) in which the computer 100 is operating, screen resolution of the display screen 130, and other environmental information of the computer 100.

In step 416, the registration file 208 is received from the server. For example, upon receiving the HTTP request from the driver device 202, the web server directs the registration file 208 to be returned to the computer 100.

The method continues in FIG. 5B with launching the registration file 208 in step 418. For example, as discussed above with reference to FIG. 3, an auxiliary screen flow is downloaded from the web and is executed on the computer 100. Launching the registration file starts in decision operation 420, where it is determined if an account is to be setup with the particular service provider. For example, the registration file 208 displays a dialog on the display screen 130 to query the user if an account is to be setup. If an account is not to be setup, a "Cancel" screen is displayed in step 422 and the method is done. For example, the user may select a "Cancel" icon that initiates cancellation procedures of the registration process.

If an account is to be setup, registration information is then received from the user in step 424. For example, dialog screens are displayed during execution of the registration file 208 for the user to respond to registration queries. These dialog screens may query the user for some of the following information: username, alternative username, password, password question, password answer, first name, last name, email address, gender, birthday, and mailing address. The computer 100 receives the corresponding user-inputted information.

After user registration is received, it is determined in decision operation 426 if registration is to be confirmed or cancelled. For example, a dialog screen appears to query the user of whether to "confirm" or to "cancel" the registration process with the service provider. If registration is to be cancelled, the registration process is ceased and control is returned to the driver device 202 in step 440.

However, if registration is to be confirmed, the data gathered by the registration file 208 in step 424 is returned to the provider's web server 206 to complete network registration in step 428. For example, the registration file 208 sends the gathered account data to the driver device 202, which in turn sends the gathered account data to the provider's web server 206.

In decision operation 430, it is determined if registration is acceptable to the service provider. For example, upon receiving the account data, the service provider responds in approval or denial of registration. Registration may be unacceptable for the following reasons: insufficient information (e.g., no username provided by the user), or invalid information (e.g., a password that is too short or a username that is already in existence). If registration is not acceptable, an "Error" screen is displayed in step 436. The user will be queried whether to retry. If the user does not want to retry registration, control is returned to the driver device 202 in step 440. However, if the user does want to retry, the method returns to step 418 where the registration file 208 is reset and launched.

On the other hand, if registration is acceptable, a "Done" screen is displayed in step 432. For example, the registration file 208 launches the done screen to indicate to the user that registration is acceptable and confirmed with the service provider. In step 434, a user identification is received from the provider's web server 206. For example, the web server returns an identification code that uniquely identifies the computer 100 and/or the user for future logons with the service provider.

In one example, the identification code is accompanied by an HTTP cookie for the computer 100 to store in a cookie jar in the computer 100. An HTTP cookie, in this context, is a text file that contains registration information necessary for logons with the service provider. A cookie jar is a memory location in the computer 100 for storing HTTP cookies. The HTTP cookie may be retrieved from the cookie jar during future logons. The HTTP cookie will allow for quick and easy logons, that is, when the user logs onto the same service provider using the same computer 100.

If for some reason the user identification is not properly received from the provider's web server 206, error messages are displayed and the computer 100 retries to get the user identification from the provider's web server 206.

In step 440, control of network setup procedures is returned to the driver device 202. Success or failure parameters from the registration process are also returned to the driver device 202. Registration completion operations are then performed in step 442. For example, the driver device 202 may send success commands to a plug-in device 204, which will in turn initiate displaying of successful completion screens. Alternatively, the driver device 202 may send failure commands to a plug-in device 204, which will in turn initiate displaying of cancellation screens. Upon performing the completion operations, the method is then done.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, identifying plug-in devices, requesting registration file downloads, launching registration processes, and transferring registration data to service providers, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for providing wireless services, comprising: a server configured to communicate over a plurality of different carrier networks with a plurality of mobile devices and to provide wireless services from a service provider to the plurality of mobile devices over the plurality of different carrier networks, wherein each of the plurality of different carrier networks is operated by one of a plurality of different wireless carriers, wherein the server is configured to obtain a registration file that is executable by the plurality of mobile devices, the registration file associated with at least one particular carrier or service provider, and wherein the server is configured to receive registration information from at least one of the plurality of mobile devices and to create an account for providing the wireless services from the service provider to the at least one mobile device based on the registration information.

2. The system of claim 1, wherein the server is configured to communicate with the at least one mobile device using a hypertext transfer protocol.

3. The system of claim 1, wherein the plurality of different carrier networks are the same network type.

4. The system of claim 1, wherein the plurality of different carrier networks are different network types.

5. The system of claim 1, wherein the plurality of mobile devices comprise a plurality of personal digital assistants.

6. The system of claim 1, wherein the server is configured to store the registration file that is executable by the plurality of mobile devices to generate one or more display screens, wherein the display screens are configured to collect the registration information from a user.

7. The system of claim 1, wherein the registration information received by the server comprises registration information provided by a user of at least one mobile device via a user interface of the at least one mobile device, wherein the server is configured to transmit the registration file to the at least one mobile device, wherein, upon execution on the at least one mobile device, the registration file is configured to prompt the user to enter the registration information.

8. A method of providing wireless services, comprising:
communicating, using a server, over a plurality of different carrier networks with a plurality of mobile devices;
providing, from the server, wireless services from a service provider to the plurality of mobile devices over the plurality of different carrier networks;
receiving, at the server, registration information from at least one of the plurality of mobile devices; and
creating, using the server, an account for providing wireless services from the service provider to the at least one mobile device based on the registration information,
wherein the server is configured to obtain a registration file that is executable by the plurality of mobile devices, the registration file associated with at least one particular carrier or service provider, and
wherein each of the plurality of different carrier networks is operated by one of a plurality of different wireless carriers.

9. The method of claim 8, wherein the server is configured to communicate with the at least one mobile device using a hypertext transfer protocol.

10. The method of claim 8, wherein the plurality of different carrier networks are the same network type.

11. The method of claim 8, wherein the plurality of different carrier networks are different network types.

12. The method of claim 8, wherein the plurality of mobile devices comprise a plurality of different digital assistants.

13. The method of claim 8, wherein the server is configured to store the registration file that is executable by the plurality of mobile devices to generate one of more display screens, wherein the display screens are configured to collect the registration information from a user.

14. The method of claim 8, wherein the registration information received by the server comprises registration information provided by a user of at least one mobile device via a user interface of the at least one mobile device, the method further comprising:
transmitting, from the server, the registration file to the at least one mobile device, wherein, upon execution on the at least one mobile device, the registration file is configured to prompt the user to enter registration information.

15. A program product comprising one or more non-transitory computer-readable media, the non-transitory computer-readable media having instructions stored thereon that are executable by one or more processors to implement a method of providing wireless services, the method comprising:
communicating, using a server, over a plurality of different carrier networks with a plurality of mobile devices;
providing, from the server, wireless services from a service provider to the plurality of mobile devices over the plurality of different carrier networks;
receiving, at the server, registration information from at least one of the plurality of mobile devices; and
creating, using the server, an account for providing wireless services from the service provider to the at least one mobile device based on the registration information,
wherein the server is configured to obtain a registration file that is executable by the plurality of mobile devices, the registration file associated with at least one particular carrier or service provider, and
wherein each of the plurality of different carrier networks is operated by one of a plurality of different wireless carriers.

16. The method of claim 15, wherein the server is configured to communicate with the at least one mobile device using a hypertext transfer protocol.

17. The method of claim 15, wherein the plurality of different carrier networks are the same network type.

18. The method of claim 15, wherein the plurality of different carrier networks are different network types.

19. The method of claim 15, wherein the plurality of mobile devices comprise a plurality of different digital assistants.

20. The product program of claim 15, wherein the registration information received by the server comprises registration information provided by a user of at least one mobile device via a user interface of the at least one mobile device, the program product further comprising:
- transmitting, from the server, the registration file to the at least one mobile device, wherein, upon execution on the at least one mobile device, the registration file is configured to prompt the user to enter registration.

* * * * *